(12) United States Patent
Burmester et al.

(10) Patent No.: US 12,270,488 B2
(45) Date of Patent: Apr. 8, 2025

(54) VALVE

(71) Applicant: GEA Tuchenhagen GmbH, Büchen (DE)

(72) Inventors: Jens Burmester, Grambek (DE); Jörg Pieplow, Rondeshagen (DE); Kai Volster, Wismar (DE); Alexander Enns, Schwarzenbek (DE); Nils Waldemann, Nostorf (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 17/909,533

(22) PCT Filed: Feb. 23, 2021

(86) PCT No.: PCT/EP2021/054405
§ 371 (c)(1),
(2) Date: Sep. 6, 2022

(87) PCT Pub. No.: WO2021/180458
PCT Pub. Date: Sep. 16, 2021

(65) Prior Publication Data
US 2023/0112237 A1    Apr. 13, 2023

(30) Foreign Application Priority Data
Mar. 7, 2020    (DE) .................... 10 2020 001 485.2

(51) Int. Cl.
*F16K 35/02*    (2006.01)
*F16K 1/22*    (2006.01)
(Continued)

(52) U.S. Cl.
CPC ............ *F16K 35/025* (2013.01); *F16K 1/221* (2013.01); *F16K 31/602* (2013.01);
(Continued)

(58) Field of Classification Search
CPC ...... F16K 35/025; F16K 1/221; F16K 31/602; F16K 35/06; F16K 35/10; F16K 35/027
See application file for complete search history.

(56) References Cited

U.S. PATENT DOCUMENTS 3,448,762 A * 6/1969 Schmitt ............... F16K 37/0008
137/383
3,687,415 A * 8/1972 Turkot .................. F16K 31/055
251/89

(Continued)

FOREIGN PATENT DOCUMENTS

| DE | 10 2013 005 458 A1 | 10/2014 |
|----|----|----|
| WO | 2000/022327 A1 | 4/2000 |
| WO | 2011/123128 A1 | 10/2011 |

*Primary Examiner* — Craig M Schneider
*Assistant Examiner* — Christopher D Ballman
(74) *Attorney, Agent, or Firm* — Young Basile Hanlon & MacFarlane, P.C.

(57) ABSTRACT

A valve has a closing member that can be brought from a closed position into an open position by a rotational movement about an axis of rotation transverse to a through-flow direction. A shaft is connected to the closing member and comprises a shaft end. A valve housing has an adjusting device, which has an adjusting device housing and comprises a receptacle in which the shaft end can be received. In order to be able to fix the valve in a switching position, a shaft portion comprises a passage that can be made congruent with two housing-side openings. The passage and the openings can be penetrated by a securing body, and the connection between the shaft and the shaft portion is secured against release when the passage and the openings are congruent.

20 Claims, 4 Drawing Sheets

(51) Int. Cl.
 *F16K 31/60* (2006.01)
 *F16K 35/06* (2006.01)
 *F16K 35/10* (2006.01)

(52) U.S. Cl.
 CPC ............ *F16K 35/027* (2013.01); *F16K 35/06* (2013.01); *F16K 35/10* (2013.01)

(56) References Cited

U.S. PATENT DOCUMENTS

| | | | | |
|---|---|---|---|---|
| 4,203,572 A * | 5/1980 | Coffman | F16K 5/08 | 251/95 |
| 4,231,389 A * | 11/1980 | Still | F16K 31/54 | 251/291 |
| 4,638,650 A * | 1/1987 | Hafele | F16K 35/06 | 70/179 |
| 4,647,003 A * | 3/1987 | Hilpert | F16K 31/1635 | 137/554 |
| 4,936,336 A * | 6/1990 | McCauley | E03B 9/02 | 137/382.5 |
| 5,213,308 A * | 5/1993 | Jeromson | F16K 35/06 | 70/180 |
| 5,236,172 A | 8/1993 | Friemoth et al. | | |
| 5,557,955 A * | 9/1996 | Kinsella | E03C 1/041 | 70/211 |
| 6,453,707 B2 * | 9/2002 | Nishimura | F16K 35/10 | 70/180 |
| 6,568,422 B2 * | 5/2003 | Niessen | F16K 1/523 | 137/385 |
| 6,612,219 B2 * | 9/2003 | Niessen | F15B 15/24 | 92/120 |
| 6,640,688 B1 * | 11/2003 | Harper | F15B 15/261 | 92/140 |
| 6,848,672 B2 * | 2/2005 | Cross | F16K 31/055 | 285/921 |
| 6,920,894 B1 * | 7/2005 | Nickeas | F16K 35/06 | 70/180 |
| 6,994,106 B1 * | 2/2006 | Hackley | E03B 9/06 | 70/180 |
| 8,210,201 B2 * | 7/2012 | Fowler | F16K 35/10 | 137/489.5 |
| 9,062,789 B2 * | 6/2015 | Buergi | F16K 37/0041 | |
| 9,982,798 B2 * | 5/2018 | Spinney | F16K 35/10 | |

\* cited by examiner

VALVE

TECHNICAL FIELD

The invention relates to a valve used in systems for the production of food products, beverages, medicines, and fine chemical products, as well as in biotechnology.

BACKGROUND

During maintenance of such systems, it is important to bring at least parts thereof into a defined state and to keep them securely therein. For example, it may be necessary to exchange a pipe piece with a device and to remove this pipe piece from the system. A valve is shut off upstream and downstream of the pipe piece so that it can be removed. So long as the pipe piece is removed, care must be taken that the valves remain shut off. Otherwise, there is a risk of contamination of the system and/or loss of product.

WO 2011/123128 A1 provides a valve for controlling gas flows. A closing member is attached to a valve rod which penetrates a sleeve rotatably mounted in a housing. A handwheel is attached to the sleeve. Rotation of the handwheel causes rotation of the sleeve. This rotation is translated into an axial movement of the valve rod by means of threads on the valve rod and the sleeve. The valve rod projects out of the handwheel and has a transverse bore for receiving a shackle of a shackle lock. As a result, the valve can be blocked in an open position of the closing member.

WO 2000/022327 A1 proposes a hand-operated valve, the valve rod of which can be adjusted in an axial direction with the aid of a handwheel. This adjustment can be blocked by a shackle lock having a shackle which is inserted through a hole in the handwheel.

A butterfly valve with hand lever adjustment of the closing member is described in DE 10 2013 005 458 A1. A retrofittable component is proposed that surrounds the part of the valve on which the hand lever is connected to the valve rod. The component has at least one opening, through which a shackle of a shackle lock can be inserted. If the hand lever penetrates the shackle of the shackle lock mounted on the component in this way, the valve is secured against adjustment of the closing member.

SUMMARY

It is thus an object of the invention to provide a valve that can be fixed in a position with increased secureness and in a cost-effective manner.

The valve has a closing member that can be brought from a closed position into an open position by a rotational movement about an axis of rotation transverse to a throughflow direction. The closing member may be formed as a disc. A valve of this type is also called a butterfly valve and comprises a shaft that is connected to the closing member and comprises a shaft end. Valves of this type in which the closing member and shaft are produced as one part, for example by using a forging process, are cost-effective and hygienic. The valve furthermore comprises a valve housing, an adjusting device that has an adjusting device housing, and a receptacle in which the shaft end can be received.

It is proposed that a shaft directly or indirectly connected to a closing member be blocked directly.

For this purpose, a shaft portion comprises a passage that can be made congruent with two housing-side openings, and the passage and the openings can be penetrated by a securing body. The connection between the shaft and the shaft portion is secured against release when the passage and the openings are congruent. "Housing-side" means an arrangement on a stationary part of the valve or a component attached thereto. In the case of the adjusting device, it is the adjusting device housing. "Openings" can be drilled through-holes or U-shaped recesses. The function to be fulfilled is the fixation of the securing body against rotational movement about the axis of rotation.

The movement of the closing member is blocked in the presented manner close to the axis of rotation and not radially offset to it as in the prior art. The risk of incorrect operation or circumvention of the blocking is greatly reduced in this way. The arrangement is cost-effective and can be retrofitted.

Structurally simple and cost-effective retrofitting is achieved in that an intermediate housing is arranged between the adjusting device and the valve and has an intermediate shaft that is coupled to the actuating shaft of the adjusting device and the shaft of the valve. The intermediate shaft then assumes the function of the shaft portion.

The secureness of the arrangement against unintentional actuation of the valve is increased in a further development. In this further development, the shaft and the intermediate shaft are secured with a screw connection, wherein a cover covers the screw in particular when the valve is in the switching position to be blocked. The screw is then no longer accessible, and the shaft and the intermediate shaft are reliably connected to one another. The fixation of the closing member is no longer releasable.

According to an advantageously secure further development, which is well suited for force transmission during valve actuation, the shaft end is received in a second receptacle on the intermediate shaft, wherein the receptacle and the second receptacle are geometrically similar to one another. This also makes it possible to retrofit the arrangement with the intermediate housing and the intermediate shaft. The component with the intermediate shaft, which contains the LOTO function, is used only between the valve and the adjusting device, wherein the geometric similarity causes a function-maintaining coupling of the shaft, the intermediate shaft, and the actuating shaft.

According to a cost-effective design, which is technically simple and secure against malfunction by the use of fewer components, a portion of a shackle of a shackle lock, for example a padlock, is used as a securing body.

In another embodiment, a bolt is used as the securing body. It has a head that is larger than the hole of the passage so that the securing body is fixed interlockingly in a first direction. In the other direction, the fixation takes place, for example, by a shackle lock inserted through a transverse bore of the securing body, wherein this transverse bore is arranged on the side of the adjusting device or intermediate housing opposite the head. Such a bolt is advantageous for a large valve size because shackle locks are not available in all dimensions. In addition, it is advantageous with respect to installation space requirements because a bolt can be used more easily than a long shackle lock in tight spatial conditions.

Additional secureness during normal operation and when fixed in a desired position is provided by an embodiment according to which interlocking elements are provided on the adjusting device housing and intermediate housing. The interlocking elements secure the adjusting device housing, the intermediate housing, and the valve against mutual rotation by means of an interlocking connection. In this way, the closing member is prevented from being adjusted by rotation of the intermediate housing.

The embodiments presented advantageously combine reliably with adjusting devices comprising a hand lever for manual actuation of the valve. The embodiments can also be used with pneumatic adjusting devices.

On the basis of some embodiments and further developments thereof, the invention is to be explained in more detail and the description of the effects and advantages is to be expanded upon.

DETAILED DESCRIPTION

Figure 1:
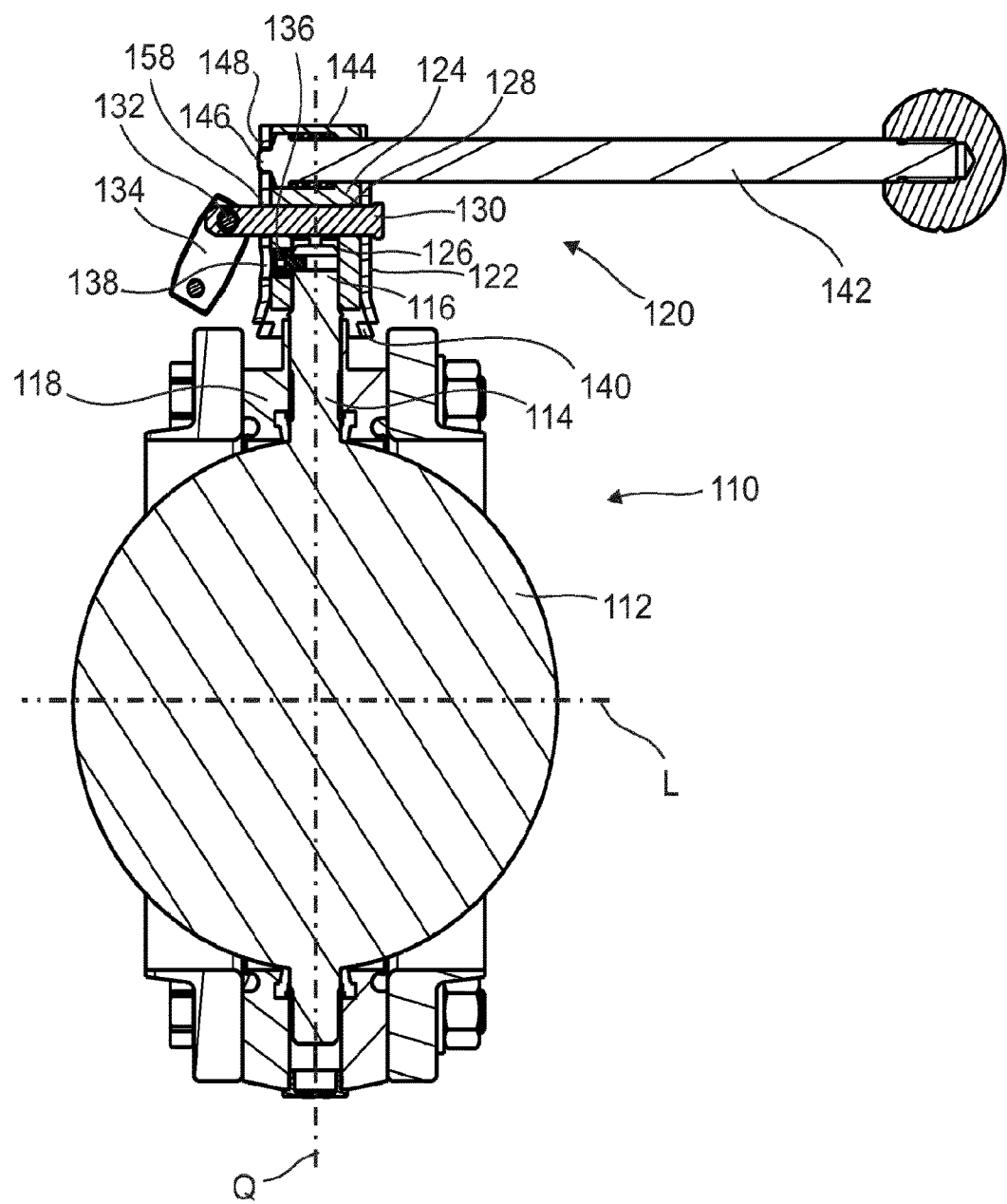
FIG. 1 shows a section through a valve according to a first embodiment in the open position.

A first embodiment according to FIG. 1 shows a valve 110 having a closing member 112 that can be brought from a closed position into an open position by a rotational movement about an axis of rotation Q. The axis of rotation Q is transverse to a through-flow direction L. The valve 110 also has a shaft 114, which is connected to the closing member and which comprises a shaft end 116, a valve housing 118, an adjusting device 120, which has an adjusting device housing 122, and an actuating shaft 124 with a receptacle 126 in which the shaft end 116 can be received. The actuating shaft 124 comprises a passage 128 that can be made congruent with (e.g., two) holes in the adjusting device housing 122, the passage and holes can be penetrated by a securing body 130, and the axis of rotation Q intersects the securing body 130.

The actuating shaft 124 forms a shaft portion that comprises the passage 128, which can be made congruent with two housing-side openings. The passage 128 and the openings 158 can be penetrated by a securing body 130. The connection between the shaft and the shaft portion is secured against release when the passage 128 and the openings 158 are congruent.

The securing body 130 can be a shackle of a shackle lock. Because this requires a special shackle lock in the case of large valves, it is advantageous to design the securing body 130 as an independent component and to provide the securing body 130 with a hole that receives the shackle 132 of a shackle lock 134 that is a standard shackle lock.

The shaft end 116 received in the receptacle 126 of the actuating shaft 124 can be secured against mutual rotation by an interlocking design of the receptacle 126 and the shaft end 116. A screw 136 secures this connection between the actuating shaft 124 and the shaft end 116 against movement in the direction of the transverse axis Q. The screw 136 is accessible via an opening 138 in the adjusting device housing 122.

To additionally secure the fixation of the closing member 112 in a position brought about by the securing body 130 and the shackle lock 134, a cover of the opening 138 can be provided. This cover is advantageously fixed by the shackle lock 134. Alternatively, or additionally, the cover can be non-releasably connected to the securing body 130, for example by an integral bond. The cover can be designed, for example, as a shell portion (half-shell or the like), which conforms to an exterior wall of the adjusting device housing 122.

The adjusting device housing 122 has at least one interlocking element 140, which engages with the valve housing 118 and prevents a rotation of the adjusting device housing 122 against the valve housing 118.

The adjusting device 120 has a hand lever 142, which can be moved against the force of a spring 144 in a radial direction transverse to the transverse axis Q. With this movement, a lug 146 is removed from a locking receptacle 148 on the adjusting device housing 122. Only when the lug 146 is removed from the locking receptacle 148 is a rotation of the actuating shaft 124 possible about the transverse axis Q. When the lug 146 is received in the locking receptacle 148, the actuating shaft 124 is secured against rotation about the transverse axis Q.

Figure 2:
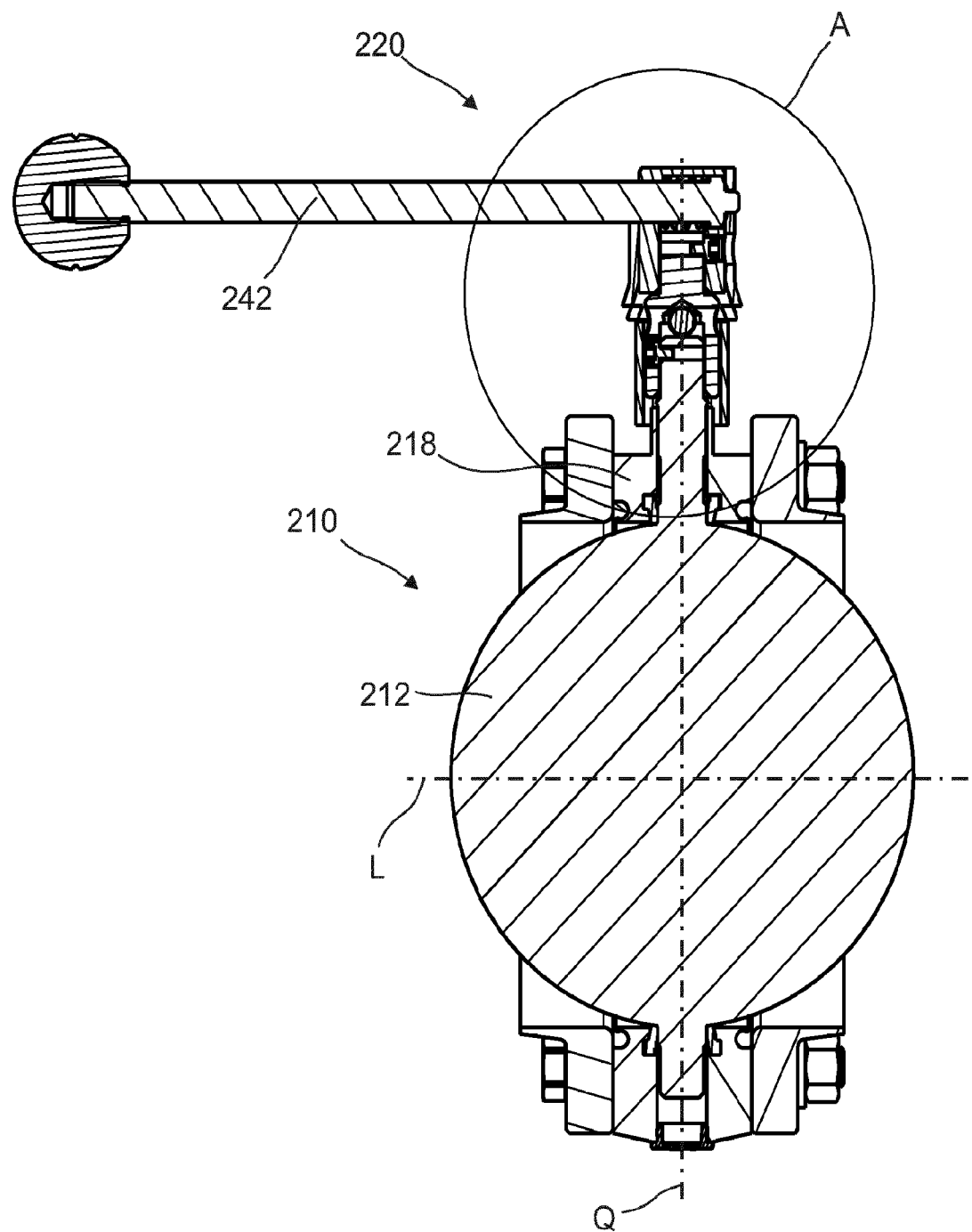
FIG. 2 shows a section through a valve according to a further development.
Figure 3:
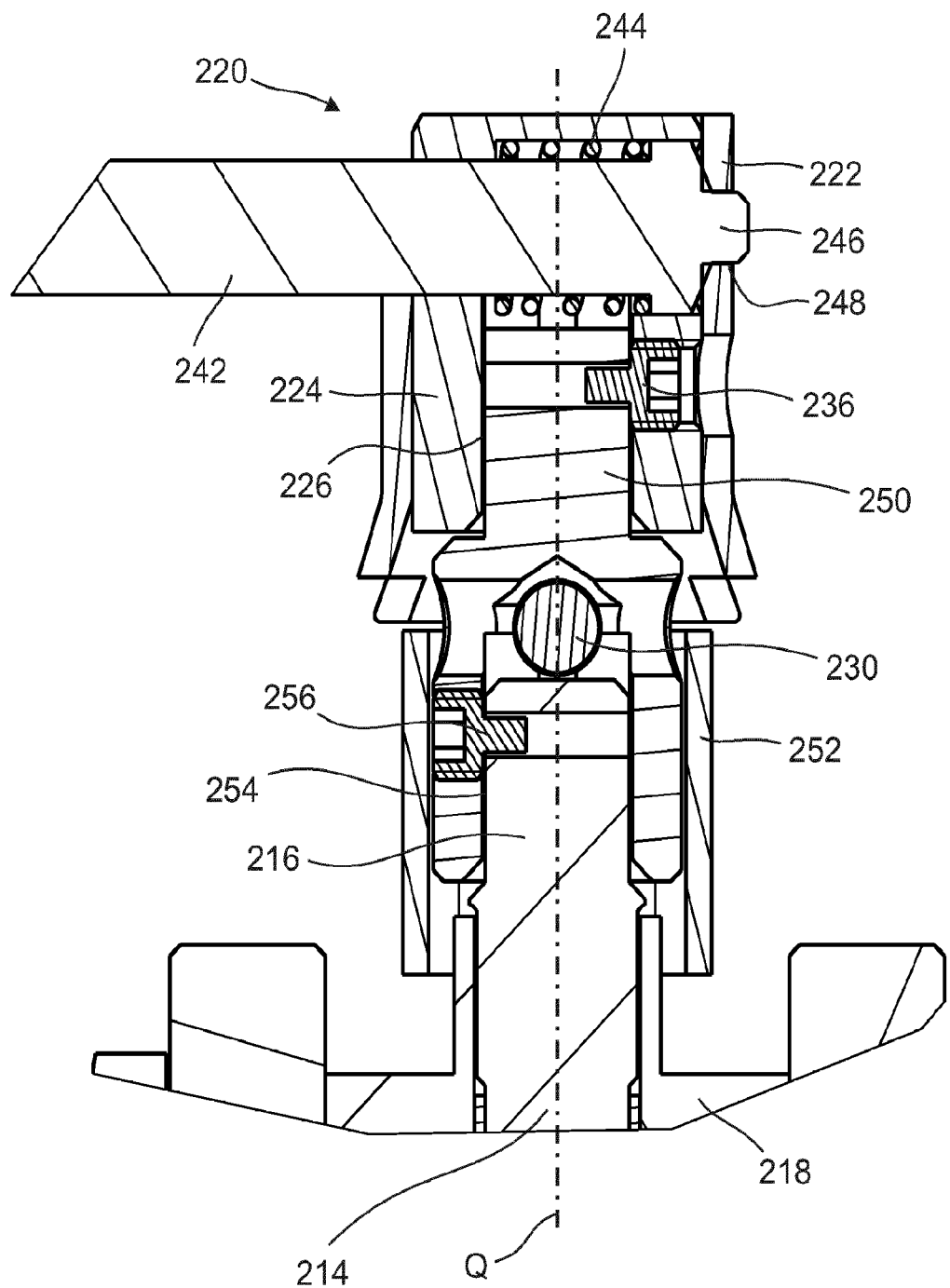
FIG. 3 shows a partial section A through the valve according to FIG. 2.
Figure 4:
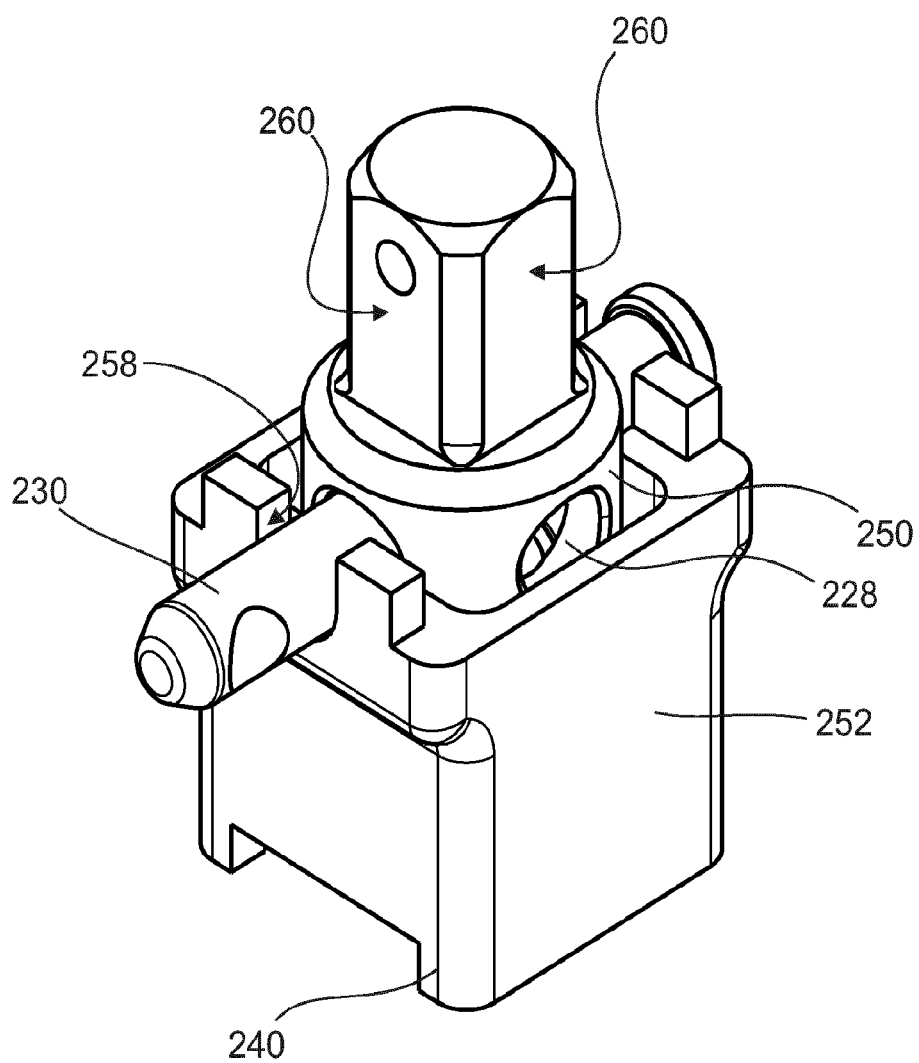
FIG. 4 shows a perspective view of an intermediate housing.

FIGS. 2, 3, and 4 show a further development of the described valve.

FIG. 2 shows a section through a valve 210 with a closing member 212 designed as a disc. The closing member 212 is mounted rotatably about a transverse axis Q in a valve housing 218. The transverse axis Q is transverse to the flow direction L along which the flow can pass through the valve housing 218, for example at a right angle. The rotation of the closing member 212 about the transverse axis Q can be brought about with the aid of an adjusting device 220. The adjusting device 220 can have a hand lever 242.

The detail A from FIG. 2 is shown in FIG. 3. In this further development, the adjusting device 220 likewise has a hand lever 242 mounted in an adjusting device housing 222. The hand lever 242 is movable relative to the adjusting device housing 222 against the force of a spring 244 to move a lug 246, provided at one of its ends, out of a locking receptacle 248. When the lug 246 is received in the locking receptacle 248, the hand lever 242 is not movable in a circumferential direction about the transverse axis Q. When the lug 246 is pulled out of the locking receptacle 248, this movement is possible in the circumferential direction. This movement causes the actuating shaft 224 to rotate about the transverse axis Q.

The rotation of the actuating shaft 224 is transmitted to an intermediate shaft 250, which is connected to the actuating shaft 224 and forms a shaft portion and which is received in sections in a receptacle 226. The receptacle 226 and the section of the intermediate shaft 250 received therein are designed in a force-transmitting manner, for example in that they form an interlocking connection in the circumferential direction about the transverse axis Q. This interlocking connection can be replaced or supported by a screw 236.

The intermediate shaft 250 is rotatably received in an intermediate housing 252, which is supported in a rotationally fixed manner on the valve housing 218. The intermediate shaft 250 has a second receptacle 254 in which the shaft end 216 connected to the closing member is received in a rotationally fixed manner. As a result of this arrangement, a rotation of the actuating shaft 224 about the transverse axis Q, which is initiated by the hand lever 242, is converted into a rotation of the shaft 214, and the valve 210 is brought from a closed position into an open position and vice versa.

The connection between the intermediate shaft 250 and the shaft 214 can be advantageously secured, for example by means of a second screw 256. The second screw 256 penetrates an opening in the second receptacle 254 and engages with a thread in the shaft end 216, such that at least one interlocking connection against movement along the transverse axis Q is created.

It is advantageous to arrange the second screw 256 in at least one angular position of the intermediate shaft 250 covered by the intermediate housing 252. It is preferably the angular position in which the valve is to be secured. This prevents the second screw 256 from being removed and the valve is fixed even more securely in its position.

The intermediate shaft 250 can be blocked against rotation about the transverse axis Q in that a securing body 230 penetrates the openings and/or recesses in the intermediate shaft 250 and in the intermediate housing 252. The securing body 230 can in turn be secured against removal by a shackle lock. The intermediate shaft 250 can have more than one opening or recess, which are arranged in an angularly offset manner with respect to one another, such that the valve can be fixed in each one of a plurality of positions.

FIG. 4 shows the intermediate housing 252 in a perspective view. A passage 228 for receiving the securing body 230 can be seen more easily in this view. By rotating the intermediate shaft 250, the openings 258 of the passage 228 can be aligned so that the securing body 230 penetrates the passage 228 and the openings 258. As a result, further rotation of the intermediate shaft 250 is blocked. Each of the openings 258 may be a hole, a bore, or a recess. FIG. 4 also shows an interlocking element 240 that brings about a securing of the support of the intermediate housing 252 on the valve housing 218 against rotation about the transverse axis Q. The intermediate shaft 250 has flat surfaces 260. The flat surfaces 260 form a polyhedron that interacts with a corresponding polyhedron in the receptacle 226 so that the intermediate shaft 250 is received interlockingly in the receptacle 226.

A further advantage of the exemplary embodiment explained with reference to FIGS. 2 to 4 is that the intermediate housing 252 and intermediate shaft 250 can be retrofitted on existing valves. This advantage is increased in that the receptacle 226 and the second receptacle 254 are similar geometrically to each other.

This example thus describes a valve 210 having a closing member 212 that can be brought from a closed position into an open position by a rotational movement about an axis of rotation Q, which is transverse to a through-flow direction L. The valve 210 has a shaft 214, which is connected to the closing member 212 and which comprises a shaft end 216. The valve 210 also includes a valve housing 218, having an adjusting device 220, which has an adjusting device housing 222 and comprises a receptacle 226 in which the shaft end 216 can be received. The valve 210 includes an intermediate housing 252 with an intermediate shaft 250 that is rotatably received therein and that is connected to the shaft 214 and is received in the receptacle 226. The valve 210 is characterized in that the intermediate shaft 250 comprises a passage 228 that can be made congruent with (e.g., two) openings 258 in the intermediate housing. The passage 228 and the openings 258 can be penetrated by a securing body 230, and the connection between the shaft 214 and the intermediate shaft 250 is secured against release when the passage 228 and the openings 258 are congruent.

The embodiment according to FIGS. 2, 3, and 4 is shown with an adjusting device, which can be manually actuated. However, the adjusting device can also be operated with a pressure medium, for example pneumatically. In such an embodiment, it is expedient to configure the connections between the adjusting device and the intermediate housing as well as between the intermediate housing and the valve housing. This can be done, for example, with the aid of screws that penetrate a flange on a first component, for example the adjusting device housing and the intermediate housing, and are received in each case in threads in the associated other component, for example the intermediate housing and the valve housing. The number of screws in the connection depends, inter alia, on the valve size and the forces and torques transmitted via the shaft between the adjusting device and the closing member.

A particular advantage of the exemplary embodiments presented is that of fixing the valve in a position not by the fixation of an operating element of the adjusting device such as the hand lever or a handwheel, but rather blocking the shaft of the valve or a shaft connected thereto as directly as possible.

The following is a list of reference numbers used in the drawings and this description.

110; 210 Valve
112; 212 Closing member
114; 214 Shaft
116; 216 Shaft end
118; 218 Valve housing
120; 220 Adjusting device
122; 222 Adjusting device housing
124; 224 Actuating shaft
126; 226 Receptacle
128; 228 Passage
130; 230 Securing body
132 Shackle
134 Shackle lock
136; 236 Screw
138 Opening
140; 240 Interlocking element
142; 242 Hand lever
144; 244 Spring
146; 246 Lug
148; 248 Locking receptacle
250 Intermediate shaft
252 Intermediate housing
254 Second receptacle
256 Second screw
158; 258 Opening for securing body
260 Flat surface
L Flow direction
Q Transverse axis

The invention claimed is:

1. A valve, comprising:
a closing member that can be brought from a closed position into an open position by a rotational movement about an axis of rotation, wherein the axis of rotation is transverse to a through-flow direction;
a shaft connected to the closing member, wherein the shaft comprises a shaft end;
a valve housing;
an adjusting device, wherein the adjusting device has an adjusting device housing and comprises a receptacle in which the shaft end can be received;
a shaft portion including a passage that can be made congruent with housing-side openings, wherein the passage and the housing-side openings can be penetrated by a securing body, and a connection between the shaft and the shaft portion is secured against release when the passage and the housing-side openings are congruent;
an intermediate housing having an intermediate shaft that is rotatably received therein, wherein the intermediate shaft is connected to the shaft and is received in the receptacle, the intermediate shaft comprises the shaft portion with the passage, and the housing-side openings are formed in the intermediate housing; and a screw that penetrates an opening of the intermediate shaft and engages with the shaft, wherein the screw is covered by the intermediate housing for securing against release, and wherein an interior surface of the intermediate housing is immediately adjacent to an end face of the screw when the securing body penetrates the passage in the intermediate shaft and the housing-side openings in the intermediate housing.

2. The valve according to claim 1, wherein the intermediate shaft comprises a second receptacle in which the shaft end can be received, and the second receptacle is formed geometrically similar to the receptacle.

3. The valve according to claim 1, wherein the securing body is a portion of a shackle of a shackle lock.

4. The valve according to claim 3, comprising:
interlocking elements are provided on the adjusting device housing and the intermediate housing, wherein the interlocking elements secure the adjusting device housing, the intermediate housing, and the valve against mutual rotation by means of an interlocking connection.

5. The valve according to claim 1, wherein the securing body comprises a bolt with a head that is larger than the passage and a bore for receiving a lock shackle.

6. The valve according to claim 5, comprising:
interlocking elements are provided on the adjusting device housing and the intermediate housing, wherein the interlocking elements secure the adjusting device housing, the intermediate housing, and the valve against mutual rotation by means of an interlocking connection.

7. The valve according to claim 1, wherein the adjusting device comprises a hand lever with which the rotational movement can be brought about.

8. The valve according to claim 7, comprising:
interlocking elements are provided on the adjusting device housing and the intermediate housing, wherein the interlocking elements secure the adjusting device housing, the intermediate housing, and the valve against mutual rotation by means of an interlocking connection.

9. The valve according to claim 1, comprising:
interlocking elements are provided on the adjusting device housing and the intermediate housing, wherein the interlocking elements secure the adjusting device housing, the intermediate housing, and the valve against mutual rotation by means of an interlocking connection.

10. The valve according to claim 1, wherein the adjusting device comprises a piston actuated by a pressure medium.

11. The valve according to claim 1, wherein the closing member comprises a disc.

12. The valve according to claim 1, wherein the housing-side openings in the intermediate housing have a substantially U-shaped configuration.

13. The valve according to claim 12, wherein the securing body rests within the housing-side openings.

14. The valve according to claim 1, wherein a spacing between the interior surface of the intermediate housing and the end face of the screw is less than a length of the screw.

15. The valve according to claim 1, wherein the intermediate housing is disposed between the adjusting device housing and the valve housing.

16. The valve according to claim 1, a portion of the intermediate shaft that is received within the receptacle of the adjusting device housing has a diameter that is substantially similar to a diameter of the shaft end.

17. The valve according to claim 16, wherein a portion of the intermediate shaft that is rotatably received within the intermediate housing has a diameter that is greater than the diameter of the shaft end.

18. A valve, comprising:
a closing member that can be brought from a closed position into an open position by a rotational movement about an axis of rotation, wherein the axis of rotation is transverse to a through-flow direction;
a valve housing comprising the closing member;
a shaft connected to the closing member;
an intermediate housing comprising housing-side openings formed therein; and
an intermediate shaft connected to the shaft by a fastener and rotatably received within the intermediate housing, wherein the intermediate shaft comprises a passage that can be made congruent with the housing-side openings in the intermediate housing so that a securing body can penetrate the passage in the intermediate shaft and the housing-side openings formed in the intermediate housing; and
an adjusting device comprising an adjusting device housing and a receptacle in which an end of one of the shaft or the intermediate shaft can be received,
wherein the fastener is covered by the intermediate housing for securing against release, and
wherein a spacing between an interior surface of the intermediate housing and an end face of the fastener is less than a length of the fastener.

19. The valve according to claim 18, wherein the fastener is a screw.

20. The valve according to claim 19, wherein the intermediate housing is positioned between the valve housing and the adjusting device housing.

* * * * *